United States Patent
Yang et al.

(10) Patent No.: US 10,027,145 B2
(45) Date of Patent: Jul. 17, 2018

(54) METHOD FOR ADJUSTING A VOLTAGE OF BATTERY BY MEASURING A VOLTAGE DECREASE SPEED OF BATTERY

(71) Applicant: Hyundai Motor Company, Seoul (KR)

(72) Inventors: Hee Tae Yang, Seoul (KR); Yu Seok Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 73 days.

(21) Appl. No.: 15/244,112

(22) Filed: Aug. 23, 2016

(65) Prior Publication Data

US 2017/0163061 A1  Jun. 8, 2017

(30) Foreign Application Priority Data

Dec. 8, 2015 (KR) .................. 10-2015-0174309

(51) Int. Cl.
*H01M 10/44* (2006.01)
*H02J 7/00* (2006.01)
*B60L 11/18* (2006.01)

(52) U.S. Cl.
CPC ......... *H02J 7/0032* (2013.01); *B60L 11/1859* (2013.01); *B60L 11/1861* (2013.01); *H02J 7/0063* (2013.01); *H02J 2007/0067* (2013.01)

(58) Field of Classification Search
CPC .. H02J 7/0021; H02J 7/0026; H02J 2007/004; H02J 2007/0067
USPC .......................... 320/127, 129, 132, 135, 136
See application file for complete search history.

(56) References Cited

U.S. PATENT DOCUMENTS

2015/0239411 A1\* 8/2015 Nakajima ............. B60R 16/033
307/10.6

FOREIGN PATENT DOCUMENTS

| JP | 2015-120465 A | 7/2015 |
|---|---|---|
| KR | 10-2009-0062332 | 6/2009 |
| KR | 10-2011-0035693 | 4/2011 |
| KR | 10-2011-0110652 A | 10/2011 |
| KR | 10-2013-0069002 | 6/2013 |
| KR | 10-2014-0090881 | 7/2014 |
| KR | 10-2015-0093298 A | 8/2015 |

\* cited by examiner

*Primary Examiner* — Edward Tso
(74) *Attorney, Agent, or Firm* — Mintz Levin Cohn Ferris Glovsky and Popeo, P.C.; Peter F. Corless

(57) ABSTRACT

A method for preventing a discharging of a battery is provided. In particular, the method prevents a discharging of a battery by adjusting a relay turn-off voltage of the battery based on a voltage drop speed of the battery. The method includes measuring a battery voltage after a turn-off of an ignition of a vehicle, calculating a voltage drop speed from the measured battery voltage, and comparing a storing and leaving interval of the battery that corresponds to the voltage drop speed with a set storing and leaving interval. When the storing and leaving interval of the battery is less than the set storing and leaving interval calculating a relay turn-off voltage is calculated and when the relay turn-off voltage is equal to the battery voltage, a relay is turned off.

9 Claims, 4 Drawing Sheets

METHOD FOR ADJUSTING A VOLTAGE OF BATTERY BY MEASURING A VOLTAGE DECREASE SPEED OF BATTERY

CROSS-REFERENCE TO RELATED APPLICATION

This application is based on and claims the benefit of priority to Korean Patent Application No. 10-2015-0174309, filed on Dec. 8, 2015 in the Korean Intellectual Property Office, the disclosure of which is incorporated herein in its entirety by reference.

BACKGROUND (a) Field of the Invention

The present disclosure relates to a method for preventing a discharging of a battery, and more particularly, to a technology of adjusting a relay turn-off voltage of the battery by measuring a voltage decrease speed of the battery.

(b) Description of the Related Art

Generally, electronic devices for a vehicle, for example, an image recording apparatus for a vehicle (e.g., a black box for a vehicle), a path guiding apparatus (e.g., a navigation apparatus) for a vehicle, an audio and video (e.g., AV) device for a vehicle, and the like are connected to a cigar jack of the vehicle to be powered. Typically, electronic devices for a vehicle need to be continuously powered and operated even after an ignition of the vehicle is turned off. For example, the black box for a vehicle is a representative example. Since the black box for a vehicle performs a function of preparing for a traffic accident, an artificial vehicle damage accident during parking of the vehicle, or the like by recording situations during a driving of the vehicle and situations during the parking of the vehicle, the black box needs to be continuously powered from the vehicle as long as the black box does not use a self-battery.

However, since a battery for a vehicle has limited capability of about 60 AH to 100 AH, a charged battery may be fully discharged and may be difficult for the vehicle to be driven, when a generator is not operated since the ignition of the vehicle is not turned on. Therefore, a technology related to a method for preventing a discharging of a battery for a vehicle disposed between the electronic devices for the vehicle and the battery for the vehicle and prevents a power supply to the electronic devices when a voltage of the battery is less than a predetermined level is required.

The above information disclosed in this section is intended merely to aid in the understanding of the background of the invention and therefore it may contain information that does not form the prior art that is already known in this country to a person of ordinary skill in the art.

SUMMARY

The present disclosure provides a method for preventing a discharging of a battery, and more particularly, for adjusting a relay turn-off voltage of the battery by measuring a voltage drop speed of the battery.

According to an exemplary embodiment of the present disclosure, a method for preventing a discharging of a battery may include measuring a battery voltage after a turn-off of an ignition of a vehicle, calculating a voltage drop speed from the measured battery voltage, and comparing a storing and leaving interval of the battery that corresponds to the voltage drop speed with a set storing and leaving interval. When the storing and leaving interval of the battery is less than the set storing and leaving interval the method includes calculating, by a controller, a relay turn-off voltage and when the relay turn-off voltage is equal to the battery voltage, turning off a relay.

The voltage drop speed may be calculated by the controller using the battery voltage which is measured periodically and as a value obtained by dividing the battery voltage by a set time. The storing and leaving interval of the battery may be a value obtained by dividing a value obtained by subtracting a durability lowest limit voltage from an ignition turn-off voltage at the time of the turn-off of the ignition by the voltage drop speed.

The method may further include when the storing and leaving interval of the battery is greater than the set storing and leaving interval, turning off the relay when the battery voltage is equal to a durability lowest limit voltage. As a deterioration degree of the battery increases or a dark current of an electronic load increases the voltage drop speed may be increased. The method may further include measuring an ignition turn-off voltage at the time of the turn-off of the ignition of the vehicle. The voltage drop speed may include a voltage drop speed by a self discharging and a dark current and a voltage drop speed by the self-discharging. The voltage drop speed by the self-discharging may be a speed calculated by a deterioration degree map according to a deterioration degree of the battery. The relay turn-off voltage may be a voltage that satisfies the set storing and leaving interval.

BRIEF DESCRIPTION OF THE DRAWINGS

The above and other objects, features and advantages of the present disclosure will be more apparent from the following detailed description when taken in conjunction with the accompanying drawings.

DETAILED DESCRIPTION

Figure 1:
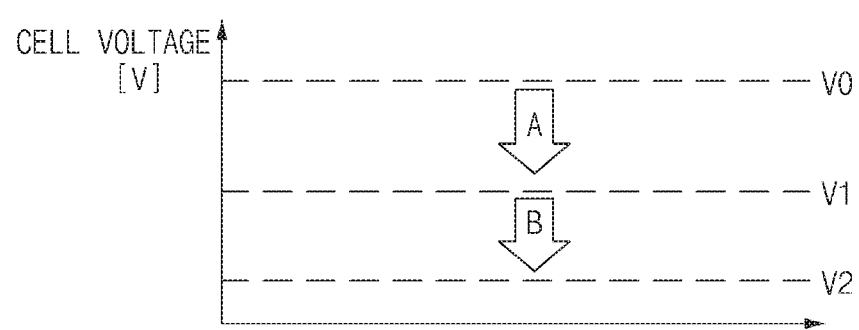
FIG. 1 is an exemplary diagram illustrating a method for controlling a relay turn-off voltage of a battery by considering a voltage drop speed of the battery according to an exemplary embodiment of the present disclosure.

Hereinafter, exemplary embodiments of the present disclosure will be described in detail with reference to the accompanying drawings. Advantages and features of the present disclosure and methods to achieve them will be set forth by exemplary embodiments described below in detail with reference to the accompanying drawings. However, the present disclosure is not limited to the exemplary embodiments set forth herein, but may be modified in many different forms. Merely, the exemplary embodiments of the present disclosure will be provided to describe the technical spirit of the present disclosure in detail so that those skilled in the art to which the present disclosure pertains may easily implement the spirit of the present disclosure. In the drawings, the exemplary embodiments of the present disclosure are not limited to illustrated specific forms, but are exaggerated for clarity. In the present specification, specific terms have been used, but are just used for the purpose of describing the present disclosure and are not used for qualifying the meaning or limiting the scope of the present disclosure, which is disclosed in the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

According to an exemplary embodiment of the present disclosure, an apparatus for preventing a discharging of a battery may include a controller configured to prevent an over-discharging. The controller may be configured to adjust a relay turn-off voltage by measuring a voltage drop speed of the battery. For example, a voltage drop speed A refers to a speed at which a voltage calculated from a battery voltage which is periodically measured after an ignition of a vehicle is turned off is decreased and discloses a speed by a self-discharging and a dark current. Further, a voltage drop speed B may be calculated using a deterioration degree map based on a deterioration degree and may disclose a speed by the self-discharging. Additionally, an ignition turn-off voltage V0 may be a reference voltage when the ignition of the vehicle is turned off, a relay turn-off voltage V1 may be a voltage that satisfies a storing and leaving interval of the battery, a durability lowest limit voltage V2 may be a minimum voltage that secures durability of the battery, a set storing and leaving interval t may be a minimum storing time set configured to operate the battery of the vehicle.

FIG. 1 is an exemplary diagram illustrating a method for controlling a relay turn-off voltage of a battery by measuring a voltage drop speed of the battery according to an exemplary embodiment of the present disclosure. Referring to FIG. 1, when an ignition of a vehicle is turned off, an apparatus that prevents a discharging of a battery may be configured to periodically measure a battery voltage. When the battery voltage reaches a set voltage (e.g., a reference voltage or a predetermined voltage), a relay may be turned off to prevent a discharging or an over-discharging of the battery. In other words, the reference voltage when the ignition of the vehicle is turned off may be defined as an ignition turn-off voltage (e.g., a first voltage V0).

In particular, a relay turn-off voltage (e.g., a relay turn-off timing) may be varied based on when a dark current generated from an electronic load of the vehicle is substantial or a deterioration degree of the battery is substantial, or when the dark current generated from the electronic load of the vehicle is minimal or the deterioration degree of the battery is minimal. In other words, when the dark current generated from the electronic load of the vehicle is increases or the deterioration degree of the battery increases, the relay turn-off voltage (a second voltage V1) based on the self-discharging and the dark current may be adjusted and the durability lowest limit voltage (e.g., a third voltage V2) based on the self-discharging may be adjusted, to secure a reference storing and leaving interval of the battery for preventing the discharging of the battery.

Figure 2:
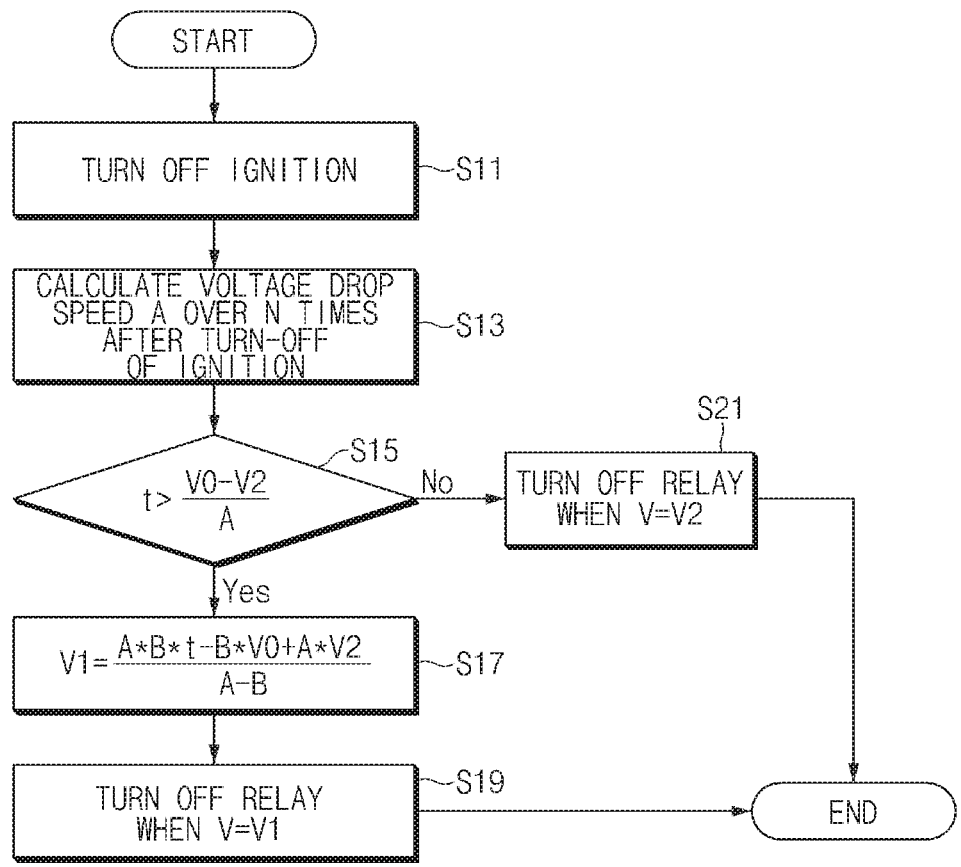
FIG. 2 is an exemplary flowchart illustrating a method for preventing a discharging of a battery according to an exemplary embodiment of the present disclosure.

FIG. 2 is an exemplary flowchart illustrating a method that prevents a discharging of a battery based on an exemplary embodiment of the present disclosure. Referring to FIG. 2, when an ignition of a vehicle is turned off, an apparatus may be configured to prevent a discharging of a battery and calculates a voltage drop speed A (S11 to S13). The voltage drop speed A may be calculated as a value obtained by dividing a battery voltage measured periodically by a set time. Specifically, the apparatus that may be configured to prevent a discharging of a battery may be configured to periodically measure the battery voltage and may be configured to calculate the voltage drop speed (mV/day, A) from the measured battery voltage. The voltage drop speed A may be calculated based on the battery voltage measured based on one day. Further, the apparatus for preventing a discharging of a battery may be configured to compare a storing and leaving interval t which is set as in the following Equation 1 with a storing and leaving interval of the battery (S15).

In particular, the storing and leaving interval of the battery may be a value obtained by dividing a difference between the ignition turn-off voltage V0 and the durability lowest limit voltage V2 by the voltage drop speed A.

$$t > \frac{V0 - V2}{A} \quad \text{Equation 1}$$

When the storing and leaving interval of the battery is less than the set storing and leaving interval t, the relay turn-off voltage V1 may be calculated as in the following Equation 3 using the following Equation 2 (S17).

$$t = \frac{V0 - V1}{A} + \frac{V1 - V2}{B} \quad \text{Equation 2}$$

$$V1 = \frac{A*B*t - B*V0 + A*V2}{A - B} \quad \text{Equation 3}$$

Further, when a measured current battery voltage V has the same value as the relay turn-off voltage V1, the apparatus that prevents a discharging of a battery may be configured to turn off a relay (S19). However, when the storing and leaving interval of the battery is greater than the set storing and leaving interval t, the apparatus for preventing a discharging of a battery may be configured to turn off the relay when the measured current battery voltage V has the same value as the durability lowest limit voltage V2 (S21).

Figure 3A:
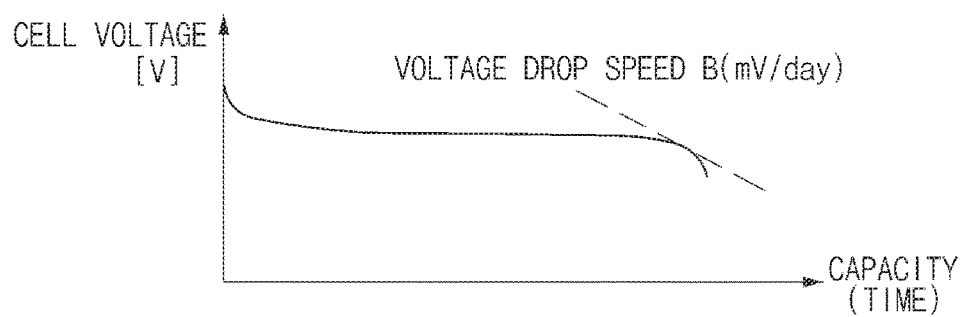
FIGS. 3A and 3B are exemplary diagrams illustrating a voltage drop speed of a battery by considering a deterioration degree of the battery, after a turn-off of the relay according to an exemplary embodiment of the present disclosure.
Figure 3B:
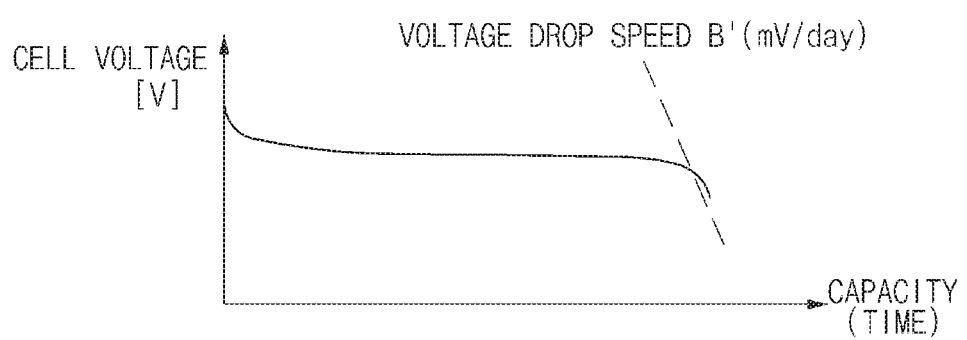

FIGS. 3A and 3B are exemplary diagrams illustrating a voltage drop speed (e.g., a self discharging speed) of a battery that may be determined by a deterioration degree of the battery, after a turn-off of the relay based to an exemplary embodiment of the present disclosure. Referring to FIGS. 3A and 3B, a voltage drop speed (mV/day, B) may be calculated using a self-discharging speed map that reflects a deterioration degree of the battery to calculate the durability lowest limit voltage V2.

TABLE 1

| Statement of Health (SOH) of Battery | Voltage Drop Speed (mV/day) | Note |
|---|---|---|
| 90~100 | 0.5 | B |
| 70~90 | 1 | B' |
| 50~70 | 1.5 | B" |

In Table 1, as the deterioration degree of the battery may increase (e.g., the Statement of Health (SOH) of the battery is decreased), the voltage drop speed B may increase and a gradient (e.g., B<B') of the voltage drop speed B to a cell voltage and capacity of the battery may further increase.

As described above, according to the exemplary embodiments of the present disclosure, the storing and leaving interval of the battery may be secured to correspond to the dark current of the electronic load or the deterioration in the battery. Further, a turn-off and a reset of the controller of the vehicle may be reduced, to prevent a decrease in marketability of the vehicle. Further, the over-discharging of the battery may be prevented and may prevent frequent replacement of the battery.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for preventing a discharging of a battery, the method comprising:
   comparing, by a controller, a battery voltage after a turn-off of an ignition of a vehicle;
   calculating, by a controller, a voltage drop speed from the measured battery voltage;
   measuring, by the controller, a storing and leaving interval of the battery that corresponds to the voltage drop speed with a set storing and leaving interval of the battery;
   calculating, by the controller, a relay turn-off voltage when the storing and leaving interval of the battery is less than the set storing and leaving interval of the battery, and when the relay turn-off voltage is equal to the battery voltage, turning off, by the controller, a relay.

2. The method according to claim 1, wherein the voltage drop speed is calculated using the battery voltage which is measured periodically and is calculated by dividing the battery voltage by a set interval.

3. The method according to claim 1, wherein the storing and leaving interval of the battery is obtained by dividing a voltage obtained by subtracting a durability lowest limit voltage from an ignition turn-off voltage at an interval of the turn-off of the ignition by the voltage drop speed.

4. The method according to claim 1, further comprising, turning off, by the controller, the relay when the battery voltage is equal to a durability lowest limit voltage when the storing and leaving interval of the battery is greater than the set storing and leaving interval.

5. The method according to claim 1, wherein when deterioration degree of the battery increases, or a dark current of an electronic load increases, the voltage drop speed is configured to increase.

6. The method according to claim 1, further comprising: measuring, by the controller, an ignition turn-off voltage at the interval of a turn-off of the ignition of the vehicle.

7. The method according to claim 1, wherein the voltage drop speed includes a voltage drop speed by a self discharging and a dark current, and a voltage drop speed by the self discharging.

8. The method according to claim 7, wherein the voltage drop speed by the self discharging is a speed calculated using a deterioration degree map based on a deterioration degree of the battery.

9. The method according to claim 1, wherein the relay turn-off voltage is a voltage configured to satisfy the set storing and leaving interval.

* * * * *